US010769589B2

(12) United States Patent
Conrad et al.

(10) Patent No.: US 10,769,589 B2
(45) Date of Patent: Sep. 8, 2020

(54) INVENTORY SYSTEM AND METHODS OF USING THE SAME

(71) Applicant: BarTrac Inc., Spring, TX (US)

(72) Inventors: Robert Alan Conrad, Spring, TX (US); Andrew Thomas Yee, Friendswood, TX (US)

(*) Notice: Subject to any disclaimer, the term of this patent is extended or adjusted under 35 U.S.C. 154(b) by 0 days.

(21) Appl. No.: 16/395,125

(22) Filed: Apr. 25, 2019

(65) Prior Publication Data

US 2019/0251507 A1 Aug. 15, 2019

Related U.S. Application Data

(63) Continuation of application No. PCT/US2018/054026, filed on Oct. 2, 2018.

(60) Provisional application No. 62/567,308, filed on Oct. 3, 2017.

(51) Int. Cl.
*G06Q 10/08* (2012.01)
*G01G 19/42* (2006.01)
*G06K 7/10* (2006.01)

(52) U.S. Cl.
CPC ......... *G06Q 10/0875* (2013.01); *G01G 19/42* (2013.01); *G06K 7/10316* (2013.01); *G06Q 10/087* (2013.01)

(58) Field of Classification Search
USPC ....................................................... 235/385
See application file for complete search history.

(56) References Cited

U.S. PATENT DOCUMENTS

| 4,314,227 | A | 2/1982 | Eventoff |
| 4,489,302 | A | 12/1984 | Eventoff |
| 8,108,068 | B1 | 1/2012 | Boucher et al. |
| 8,607,651 | B2 | 12/2013 | Eventoff |
| 9,599,525 | B2 | 3/2017 | Eventoff |
| 9,903,771 | B2 | 2/2018 | Eventoff |
| 10,262,295 | B2 | 4/2019 | Sharp, Jr. |
| 2007/0050271 | A1* | 3/2007 | Ufford ................. G06Q 10/087 705/28 |
| 2008/0084312 | A1* | 4/2008 | Daily ..................... G06K 19/02 340/572.8 |
| 2008/0120193 | A1 | 5/2008 | Schuller et al. |
| 2009/0100575 | A1 | 4/2009 | Darnborough |

(Continued)

OTHER PUBLICATIONS

International Searching Authority/US; International Search Report/Written Opinion for PCT/US1854026, Published as WO2019/070761, dated Dec. 20, 2018; 9 pages.

*Primary Examiner* — Rafferty D Kelly
(74) *Attorney, Agent, or Firm* — William R. Childs; Childs Law

(57) ABSTRACT

The present disclosure relates to an inventory system that can include a tagged inventory item, wherein the tagged inventory item includes a radio field tag attached to an inventory item; and an inventory device, wherein the inventory device includes a weighing surface, an array of force sensing resistors, and at least one radio field antenna, wherein the array of force sensing resistors and the at least one radio field antenna are configured to weigh and identify the tagged inventory item through the weighing surface, and methods of using the same. One benefit of the system and method disclosed herein can be monitoring inventory having changing amounts of content in real time.

16 Claims, 8 Drawing Sheets

(56) References Cited

U.S. PATENT DOCUMENTS

| | | | |
|---|---|---|---|
| 2011/0062236 A1* | 3/2011 | Kriebel | G06K 19/07749 |
| | | | 235/449 |
| 2013/0299583 A1* | 11/2013 | Wilkinson | G06K 7/10178 |
| | | | 235/440 |
| 2013/0314244 A1 | 11/2013 | Hershberger et al. | |
| 2014/0083207 A1 | 3/2014 | Eventoff | |
| 2016/0231167 A1* | 8/2016 | Masin | G06K 7/10386 |
| 2016/0264394 A1* | 9/2016 | Hershberger | B67D 1/0855 |
| 2017/0153153 A1 | 6/2017 | Eventoff et al. | |
| 2017/0184462 A1 | 6/2017 | Eventoff | |

* cited by examiner

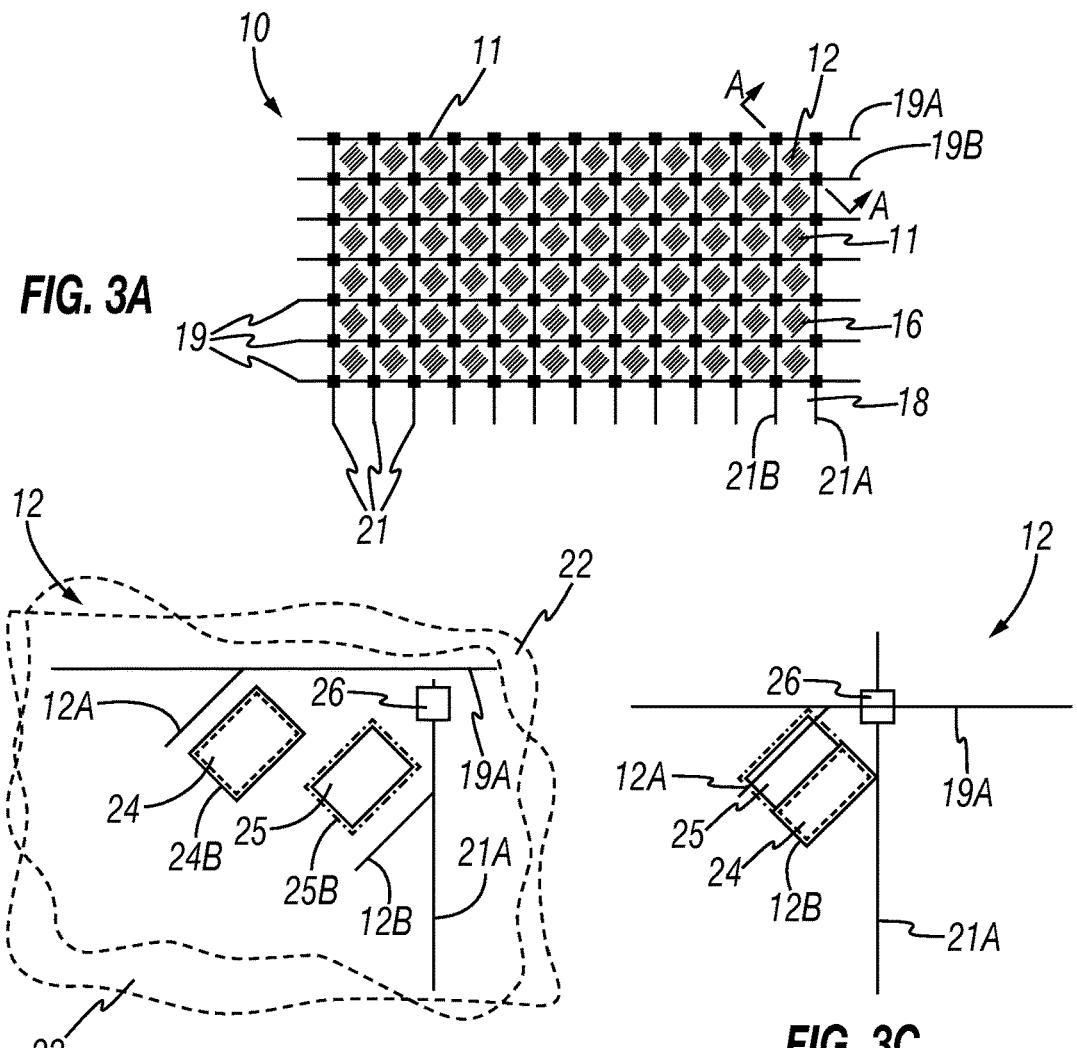
FIG. 3A
FIG. 3B
FIG. 3C
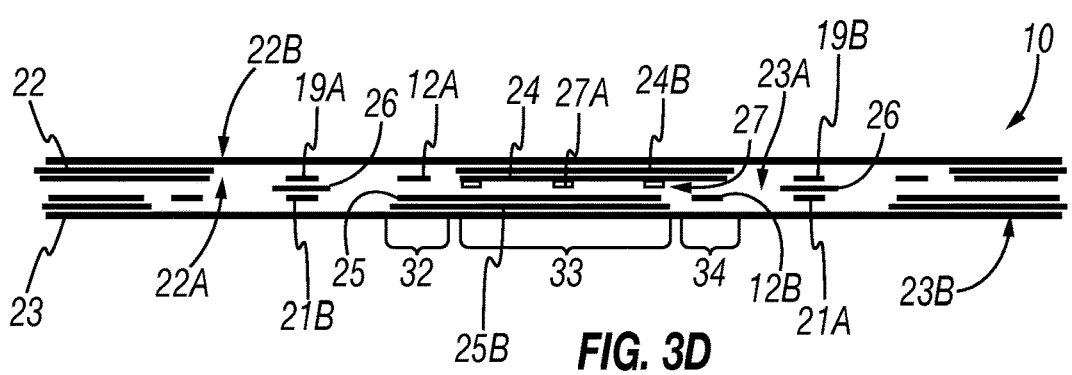
FIG. 3D
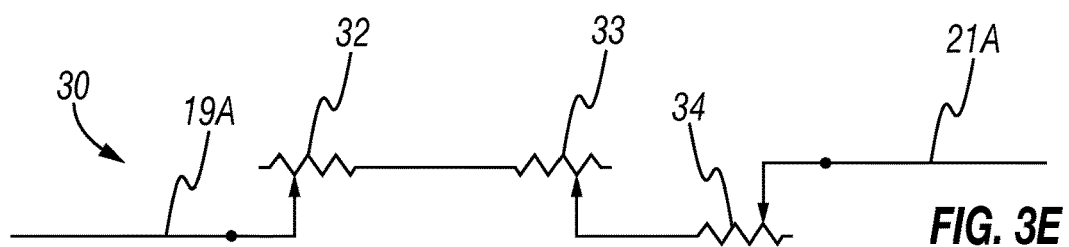
FIG. 3E

INVENTORY SYSTEM AND METHODS OF USING THE SAME

CROSS-REFERENCE TO RELATED APPLICATION

This application is a continuation application claiming benefit of pending PCT Application No.: PCT/US2018/054026, filed Oct. 2, 2018, which claims the benefit of U.S. Provisional Patent Application Ser. No. 62/567,308, filed Oct. 3, 2017, the disclosures of which are incorporated by reference in their entirety.

TECHNICAL FIELD

The present disclosure relates to an inventory system, wherein the inventory system includes an array of force sensing resistors and at least one radio field antenna configured to weigh and identify a tagged inventory item.

BACKGROUND

One of the biggest challenges in running any warehouse, stockroom, shipping area, supply depot, retail center, restaurant, bar, or any other item-based business is taking inventory. Taking inventory is an incredibly time and labor intensive task that costs millions of dollars per year. Yet inventory must be taken accurately and often. If too many items are kept in inventory, then capital is tied up in inventory and storage space becomes costly and problematic. If too few items are kept in inventory, then the business may run out of items to sell when a customer wants them, resulting in missed sales and lost customers. Also, businesses need to monitory inventory to detect breakage, theft, and other causes of lost inventory to address those inventory losses.

There have been advances in technology for monitoring the inventory of large, whole items for storage, shipping, and retail businesses. Barcodes are often scanned to monitor inventory as it arrives and departs from the business. Retail businesses often use radio frequency identification (RFID) tags to monitor and/or prevent theft of items, especially garments and electronics.

However, despite all of these advances, there remains a need for an inventory system that can track the inventory of items having an amount of content that varies over time. For example, consider the plight of the beverage and hospitality industry. Many bars have significant amounts of money invested in inventories of alcoholic beverages that are stored in many different bottles. The bottles may be opened or unopened; the contents may be sold by the bottle, by the glass, or by the portion for mixed drinks; and the contents may have vastly different prices per serving. Worse, during peak times, bartenders may not be able to place an opened bottle in the exact position where it was previously stored. Bartenders may not be able to find the opened bottle and may open another one. Also, consumers often buy different amounts of the contents of a bottle at different rates over different periods of time. Then there is the issue of content loss due to evaporation of alcohols that sit for months after being opened.

This inventory dilemma has created a huge headache for the beverage and hospitality industry. Many bars and hotels are forced to spend hours per day taking inventory of every bottle of alcoholic beverage, often multiple times per day. This task can cost a business tens of thousands of dollars in wages and be the most unpleasant part of any bartender's job.

This example is hardly isolated. The inventory of containers often depends on taking an inventory of the contents of opened containers. For example, many hospitals need to track how many pills remain in an opened bottle and where the bottle is located. Many sellers of small amounts of solids or liquids need to track inventory of chemicals, such as a solid, a liquid, or a slurry; small parts, such as nuts, bolts, and screws; and consumables, such as coffee, tea, sugar, and nuts; or any other item where it is inconvenient or impossible to attach an inventory label to the product itself.

There remains a need for an inventory system that can track the number of containers in an inventory as well as an amount of content in the opened containers. There remains a need to track where specific containers are actually located instead of where they are supposed to be located. There remains a need to cost effectively maintain real-time records of the number, location, and content of containers and opened containers.

SUMMARY

The present disclosure relates to a system. In an embodiment, the system includes a tagged inventory item, wherein the tagged inventory item includes a radio field tag attached to an inventory item; and an inventory device, wherein the inventory device includes a weighing surface, an array of force sensing resistors, and at least one radio field antenna, wherein the array of force sensing resistors and the at least one radio field antenna are configured to weigh and identify the tagged inventory item through the weighing surface. In an embodiment of the system, the radio field tag includes an item adhesive layer, a concentrating layer, and an integrated circuit layer, and the concentrating layer is in contact with and located between the item adhesive layer and the integrated circuit layer. In an embodiment of the system, the radio field tag is a passive radio frequency identification tag, a battery assisted radio frequency identification tag, an active radio frequency identification tag, or a passive near-field tag; and the at least one radio field antenna includes an active radio field antenna or a passive radio field antenna. In an embodiment of the system, the concentrating layer includes a radio signal enhancing material. In an embodiment of the system, the inventory device includes a top and a bottom, the top of the inventory device includes the weighing surface, and the array of force sensing resistors and the at least one radio field antenna are located between the top and the bottom of the inventory device. In an embodiment of the system, the array of force sensing resistors is closer to the top of the inventory device than the at least one radio field antenna, and optionally, the array of force sensing resistors is in contact with the top of the inventory device. In an embodiment of the system, the array of force sensing resistors and the at least one radio field antenna are configured to communicate with a system processor, and the system processor is configured to communicate with at least one of a database, a display, and a network. In an embodiment of the system, the inventory item includes a vessel containing an amount of content, and the content includes a solid, a liquid, a slurry, a particulate, or a combination thereof. In an embodiment of the system, the inventory item includes a vessel containing an amount of content, and the content includes a solid, a liquid, a slurry, a particulate, or a combination thereof; and the concentrating layer enhances an amount of radio signal from radio field tag to the at least one radio field antenna.

A method is disclosed herein. In an embodiment of the method, the method includes providing a system, wherein the system includes a tagged inventory item, wherein the tagged inventory item includes an radio field tag attached to an inventory item; and an inventory device, wherein the inventory device includes a weighing surface, an array of force sensing resistors, and at least one radio field antenna, wherein the array of force sensing resistors and the at least one radio field antenna are configured to weigh and identify the tagged inventory item through the weighing surface. In an embodiment, the method further includes detecting a weight change of from about 25.0 g to about 45.0 kg when the tagged inventory item is placed into contact with the weighing surface of the inventory device; measuring a weight of the tagged inventory item; and identifying the tagged inventory item by turning on the at least one radio field antenna. In an embodiment of the method, the array of force sensing resistors and the at least one radio field antenna are configured to communicate with a system processor, wherein the system processor is configured to communicate with at least one of a database, a network, and a display. In an embodiment, the method further includes transmitting at least one of a measurement time, a measurement date, a radio field tag code, a tagged inventory item identity, a temperature, a weight, and an inventory device code from the system processor to at least one of the database, the network, and the display. In an embodiment of the method, the at least one radio field antenna is turned on in response to the array of force sensing resistors detecting the weight change of from about 25.0 g to about 45.0 kg. In an embodiment, the method further includes turning off the at least one radio field antenna after communicating a radio field tag code to a system processor. In an embodiment of the method, the inventory item includes a vessel containing an amount content, wherein the content includes a solid, a liquid, a slurry, a particulate, or a combination thereof.

BRIEF DESCRIPTION OF THE DRAWINGS

The foregoing summary, as well as the following detailed description of the embodiments, will be better understood when read in conjunction with the attached drawings. For the purpose of illustration and evidence, there are shown in the drawings some embodiments, which may be preferable. It should be understood that the embodiments depicted are not limited to the precise details shown, and are not drawn to scale.

FIG. 3A is a schematic depiction of an embodiment of an array of force sensing resistors.

FIG. 3B is an exploded block diagram of the elements of a force sensing element of the array of force sensing resistors of FIG. 3A.

FIG. 3C is an oriented layout diagram of the elements of FIG. 3B.

FIG. 3D is a cross section diagram of the force sensor assembly, including in the array of force sensing resistors of FIG. 3A taken along A-A.

FIG. 3E is a schematic circuit diagram of an array of force sensing resistors.

DETAILED DESCRIPTION

Figure 1:
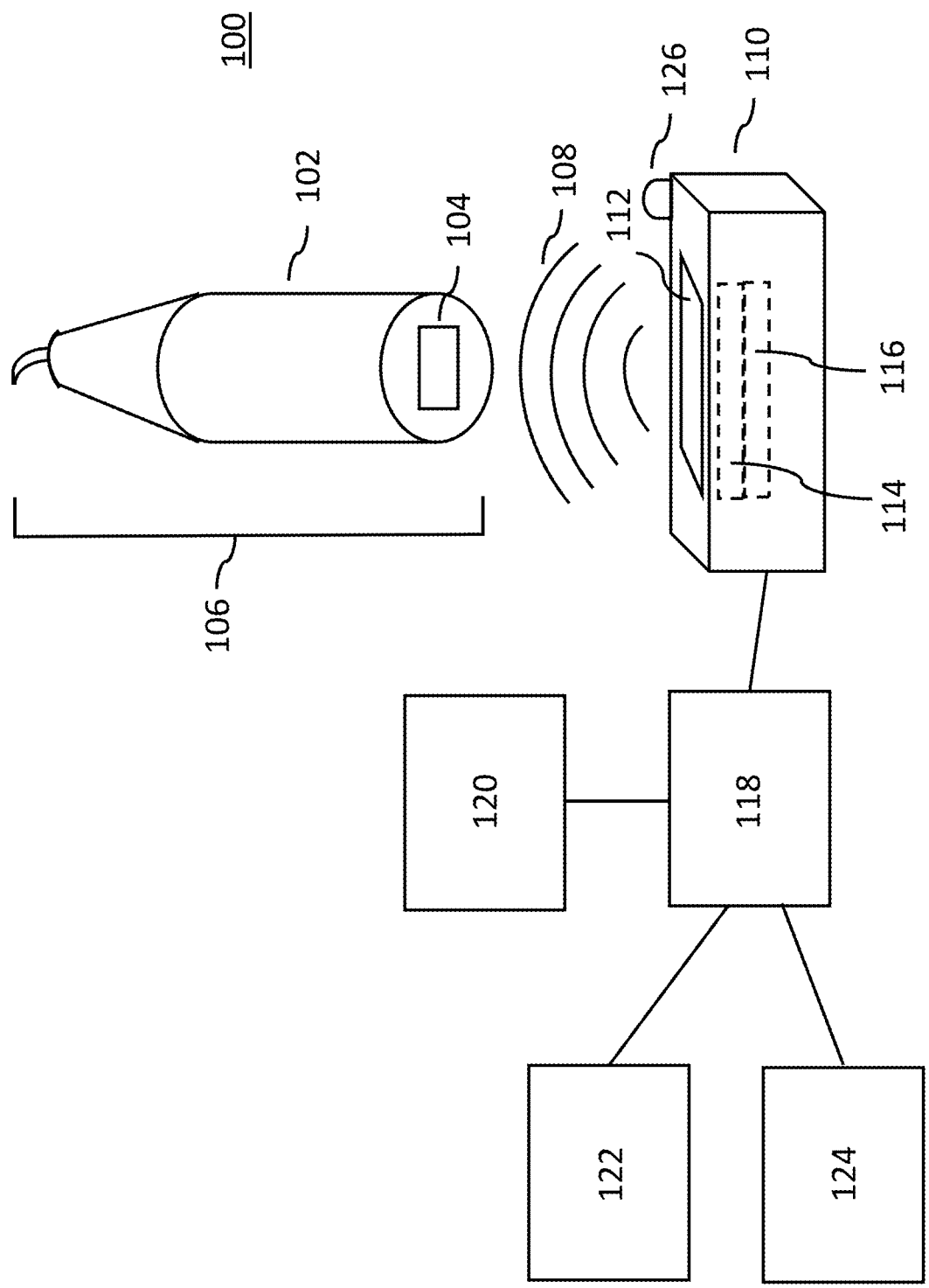
FIG. 1 is a schematic depiction of an embodiment of a system.

Conventional inventory systems can take, monitor, and record the inventory of large, whole items based on the assumption that the contents of the item being inventoried will not change over time. Conventional inventory systems can take the inventory of items only as they move into and out of a controlled area, such as a retail store or warehouse. These conventional inventory systems work fine when selling whole items, such as garments, or packaged items, such as electronics. However, many industries, such as the entertainment industry and the hospitality industry do not just sell whole items. Instead, they sell portions of inventory items, such as liquor by the glass or by the portion. These industries spend millions of dollars on labor taking frequent inventory of bottles of their alcoholic beverages to determine their current inventory and to plan for maintaining that inventory.

These labor costs have been necessary because there does not appear to be any inventory system that is capable of maintaining a real time inventory of items, tracking varying amounts of content in the inventory items, or tracking the current location of multiple inventory items within a retail or storage space. Until now.

The present disclosure relates to a system, including an inventory system. In an embodiment, the system includes at least one tagged inventory item and at least one inventory device. In an embodiment, the tagged inventory item includes a radio field tag attached to an inventory item. For example, the tagged inventory item can be a conventional radio-frequency identification (RFID) tag adhered to an inventory item, such as an opened bottle of an alcoholic beverage. In an embodiment, the at least one inventory device includes a weighing surface, an array of force sensing resistors, and at least one radio field antenna, wherein the array of force sensing resistors and the at least one radio field antenna are configured or positioned to weigh and identify the tagged inventory item through the weighing surface. For example, an embodiment of the inventory device can take the form of a mat, wherein the mat contains an array of force sensing sensors positioned over a radio field antenna. In an embodiment, the tagged inventory item can be weighed and identified through the weighing surface when the tagged inventory item is placed onto and/or stored on top of the inventory device.

In an embodiment of the system, the inventory device can communicate a weight of the tagged inventory item, an identification code of the inventory item, and an identification code of the inventory device to a system processor. In an embodiment, the system processor can retrieve from a database the identification of the inventory item, the location of the inventory device, and the time of measurement. In an embodiment, the system processor can communicate at least one of a measurement time, a measurement date, a radio field tag code, a tagged inventory item identity, a temperature, a weight, and an inventory device code from the system processor to at least one of a database, a network, and a display. In an embodiment, a system having a plurality of tagged inventory items and inventory devices can maintain, record, track, and/or display a real time inventory of multiple tagged inventory items stored on top of multiple inventory devices, including the identify, amount of content, and location of the tagged inventory items. For example, a bartender could use the system to determine the entire inventory of a bar full of opened bottles at a single glance of the system display. In such an embodiment, the system could end the practice of wasting hours of time and millions of dollars taking and retaking the inventory of inventory items having variable amounts of content.

Unless otherwise noted, all measurements are in standard metric units. Unless otherwise noted, all instances of the words "a," "an," or "the" can refer to one or more than one of the word that they modify.

Unless otherwise noted, the phrase "at least one" means one or more than one of an object. Unless otherwise noted, the phrase "at least one of" means one or more than one of the listed objects or any combination thereof. For example, the phrase "at least one of the database, the network, and the display" would mean the database, the network, or the display, or any combination thereof.

Unless otherwise noted, the term "about" refers to ±5% of the non-percentage number that is described. For example, about 100 g, can include from to 95 to 115 g. Unless otherwise noted, the term "about" refers to ±5% of a percentage number. For example, about 20% can include from 15 to 25%. When the term "about" is discussed in terms of a range, then the term refers to the appropriate amount less than the lower limit and more than the upper limit. For example, from about 100 g to about 200 g can include from 95 to 210 g.

Unless otherwise noted, a range of numbers includes all numbers in that range. For example, the range of 1-5 g includes 1 g, 2 g, 3 g, 4 g, 5 g, and any sub range therein.

Unless otherwise noted, the term "providing" refers to any method of manufacturing, purchasing, or any method of obtaining the object being referred to.

Unless otherwise noted, the term "real time" means from instantly to 72 hours.

Unless otherwise noted, the term "radio field tag" can be used interchangeably with "radio frequency tag."

It is understood that, depending on the context, the term "radio field tag" can include an adhesive backing when not attached to an inventory item. Conversely, it is understood that, depending on the context, the term "radio field tag" can exclude an adhesive backing when attached to an inventory item.

System

In an embodiment, an inventory system is disclosed. Referring to FIG. 1, in an embodiment, the inventory system 100 include a tagged inventory item 106, wherein the tagged inventory item 106 includes a radio field tag 104 attached to an inventory item 102. In an embodiment, the inventory device 110 includes a weighing surface 112 on the exterior of the inventory device, and the inventory device includes an array of force sensing resistors 114 and at least one radio field antenna 116 inside of the inventory device. In an embodiment, the array of force sensing resistors 114 and the at least one radio field antenna 116 are configured to, capable of, or positioned to weigh and identify the tagged inventory item through the weighing surface 112. In an embodiment, when the tagged inventory item 106 is placed into contact with or onto the weighing surface 112, then the weight of the tagged inventory item 106 can press down through the material of the weighing surface 112 onto the array of force sensing resistors 114. In an embodiment, in response to detecting a weight change, the at least one radio field antenna 116 is turned on, sending out a radio field signal 108. In an embodiment, the radio field signal 108 interacts with the radio field tag 104 to pass an identification code from the radio field tag 104 through the weighing surface 112 and the array of force sensing resistors 114 to the at least radio field antenna 116. In an embodiment, the array of force sensing resistors 114 weighs the tagged inventory item 106. In an embodiment, the array of force sensing resistors 114 and at least one radio field antenna 116 are configured to, connected to, or capable of communicating with a system processor 118. In an embodiment, the system processor 118 is configured to, connected to, or capable of communicating with a database 120, a network 122, and/or a display 124. In an embodiment, the inventory device 110 can have a light source 126 on an exterior surface of the inventory device.

An inventory device is disclosed herein. In an embodiment, the inventory device includes a weighing surface, an array of force sensing resistors, and at least one radio field antenna. In an embodiment, the inventory device is configured to or capable of weighing and/or identifying the tagged inventory item through the weighing surface.

Figure 2:
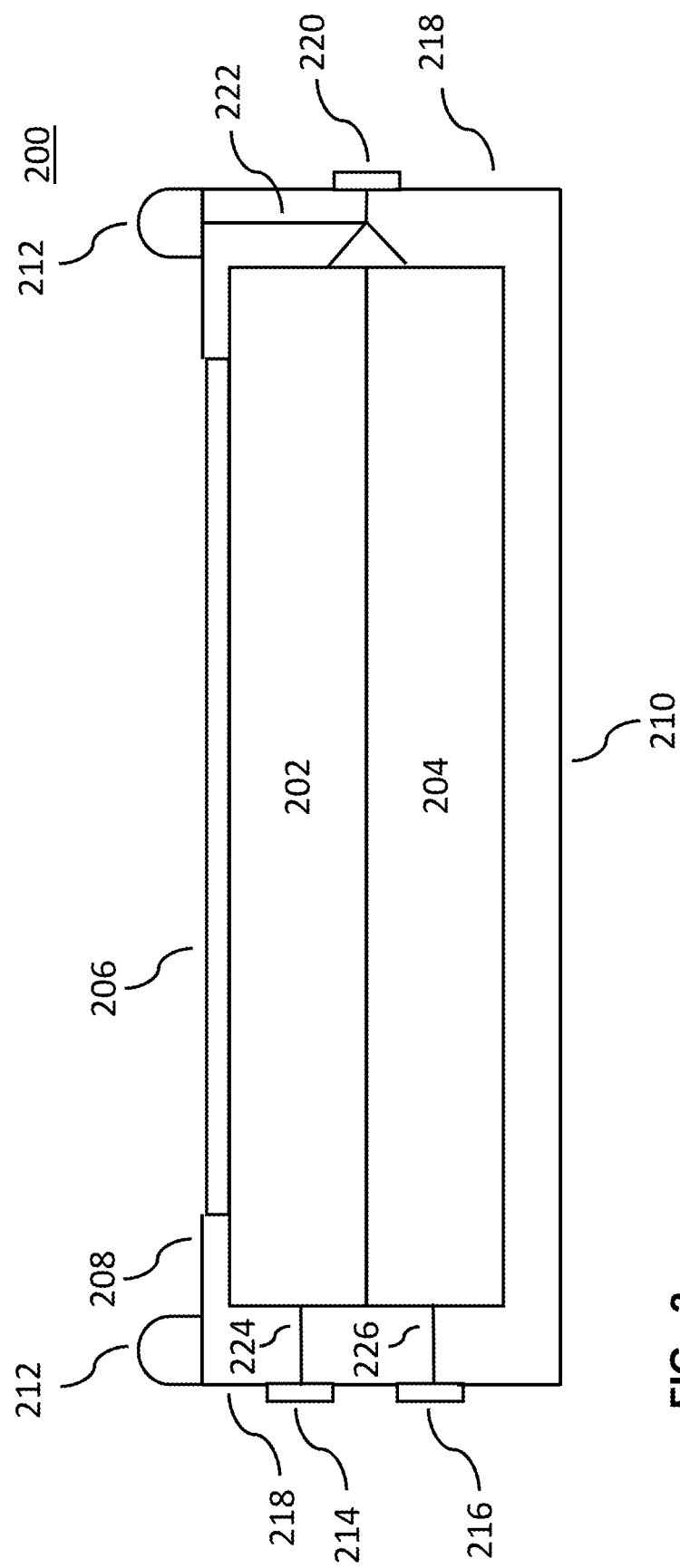
FIG. 2 is a schematic depiction of an embodiment of an inventory device of the system.

Referring to FIG. 2, in an embodiment, the inventory device 200 has a top of the inventory device 208, a bottom of the inventory device 210, and at least one side of the inventory device 218. In an embodiment, the inventory device 200 includes the top of the inventory device 208, which includes a weighing surface 206. In an embodiment, the array of force sensing resistors 202 can be positioned below the weighing surface 206 or between the weighing surface 206 and the bottom of the inventory device 210. In an embodiment, the array of force sensing resistors 202 can be located inside the inventory device 200, such that the array of force sensing resistors is surrounded or encased by the top of the inventory device 208, the bottom of the inventory device 210, and at least one side of the inventory device 218. In an embodiment, the array of force sensing resistors 202 can be in direct or indirect contact with the weighing surface 206. In an embodiment, the array of force sensing sensors 202 is positioned between the weighing surface 206 and the at least one radio field antenna 204. In an embodiment, the at least one radio field antenna 204 is located between the array of force sensing resistors 202 and the bottom of the inventory device 210. In an embodiment, the array of force sensing resistors 202 is closer to the top of the inventory device 208 than the at least one radio field antenna 204. In an embodiment, the array of force sensing resistors 202 is in direct or indirect contact with the at least one radio field antenna 204.

In an embodiment, the array of force sensing resistors 202 is connected to an array data wire 224, and the array data wire 224 is connected to an array port 214. In an embodiment, the array port 214 can be located in a side of the inventory device 218. In an embodiment, the array of force sensing resistors 202 is connected to a power wire 222, and the power wire 222 is connected to a power port 220. In an embodiment, the power port 220 can be located in a side of the inventory device 218. In an embodiment, the at least one radio field antenna 204 is connected to an antenna data wire 226, and the antenna data wire 226 is connected to an antenna port 216. In an embodiment, the antenna port can be located in a side of the inventory device 218. In an embodiment, the at least one radio field antenna 204 is connected to a power wire 222, and the power wire 222 is connected to a power port 220. In an embodiment, the power port 220 can be located in a side of the inventory device 218. In an embodiment, at least one light source 212 is attached to or located on an exterior surface of the top of the inventory device 208.

In an embodiment, the array of force sensing resistors (AFSR) is not particularly limited, so long as the AFSR is capable of detecting a weight change and/or weighing inventory items. The array of force sensing resistors can be referred to interchangeably as a "force sensor array."

One benefit of the AFSR can be that its dimensions can cover a wide area while remaining thin enough that a radio signal or radio field signal can pass through it. Another benefit of the AFSR can be that each force sensing resistor (FSR) is capable of individually detecting and measuring a change in the force, pressure, or weight applied to an individual FSR. A benefit of the system can be that the system processor can correlate data from individual FSRs and their known location in the array to generate a weight map or weight image of the force or weight that the inventory item exerts on the AFSR. In an embodiment, the system can match a weight map from the AFSR to a known weight map from the database to identify or assist in identifying a tagged inventory item. In an embodiment, the AFSR can detect a weight change of from about 25.0 g to about 45.0 kg when an inventory item or a tagged inventory item is placed onto the AFSR directly or indirectly. It is possible for the AFSR to detect weight changes of less than 25.0 g, but lower weight change settings could result in the system being turned on or activated in response to accidental environmental changes. Is it possible for the AFSR to detect weight changes of more than 45.0 kg, but the AFSR might be damaged unless designed to withstand such weights.

In more detail, the force sensing resistors (FSR), as disclosed below are formed as a multiple membrane assembly that is capable of detecting low intensity pressure inputs, such as inventory items, and quantifying varying applications of pressure, such as weight, to the sensor surface. Pre-loading the force sensor elements results in controlled amounts of force between the two substrates causing a constant state of pre-load and eliminating the low-end or minimal pressure signal noise associated with unloaded sensors. Pre-loading the force sensing resistor sensors also enables the sensor to detect removal of low intensity pressure input such as might occur when low weight articles are placed in contact with the pre-loaded force sensor.

The conductive traces and patches discussed below will generally refer to PEDOT or other highly conductive material, generally on the order of less than 50 ohms, as the deposited material. Any suitable conductive material may be used in place of PEDOT in this disclosure, such as carbon allotropes, such as carbon nanotubes (CNT) and graphene; conductive polymers, such as poly(3,4-ethylenedioxythiophene) or PEDOT (or sometimes PEDT); or metal oxides, such as zinc oxide or indium tin oxide (ITO), indium zinc oxide (IZO), aluminum zinc oxide (AZO) or gallium zinc oxide (GZO).

The FSR devices disclosed below are formed as a membrane that is capable of detecting pressure inputs, such as inventory items, and varying applications of pressure, such as weight. A transparent or opaque force sensing membrane is formed with carbon nanotubes, conductive polymers, graphene or other conductive or semi-conductive material by using two sheet of MYLAR® (polyethylene) or other clear or opaque substrate coated with oriented patches of conductive polymer, micro-particle deposits or carbon nanotubes (CNT).

The coating process includes conductive particles or micro-particles such as zinc oxide, carbon or other suitable materials or carbon nanotubes mixed in an aqueous or other solution and deposited using any suitable technique, such as aerosol jet deposition; or suitable printing, such as screen, flexo, gravure, offset, litho or other suitable method. The aqueous solution may be an alcohol carrier or other suitable liquid and may also include one or more additives such as a suitable ionomer to bind the CNT to prevent the CNT from passing through human skin or lung membranes. The clarity or light transmission of a transparent force sensing membrane can be rated at about 92%, which to the human eye seems like looking through clear glass. Higher resistance of the conductive particle patches can improve the light transmission through the sensor. In an embodiment, conductive polymer patches, such as PEDOT or other suitably conductive polymer, may be used to form force sensing resistor (FSR) patches.

A transparent force sensing membrane is made by depositing conductive particles, such as CNT or other suitable semi-conductive particles, in FSR elements such as oriented patches on apposing surface of parallel substrates. An inventory item's input (contact) with the sensor surface is detectable when the conductive particles, tubes, wires or polymer elements in apposing patches are forced into contact with each other and with the conductive traces when the input force is applied. The more force, the more conductive elements make contact allowing the electrons to travel from one conductive trace through the contacting FSR CNT patches to a perpendicular conductive trace. Higher force also increases the contact area between the substrates that also increases conductance between conductive elements in contact on each substrate.

A small area of contact between apposing patches and their conductive traces is made when an actuator (the inventory item, such as a vessel) makes initial contact with the sensor. As force is increased, the area of contact increases, bringing more particles into play and thus increasing the conductivity of the device.

A suitable force sensing membrane is made using two parallel substrates. A first substrate has rows and columns of conductive traces formed on a first side of the substrate. Where the column traces intersect the row traces, the column traces are interrupted by forming an electrical connection through the substrate from the first side to the second side and crossing the row trace and then again forming an electrical connection from the second side of the substrate to the first side of the substrate and connecting with the interrupted column trace.

In an embodiment, a dielectric or insulating pad can be printed over the row traces allowing an uninterrupted column trace to be deposited perpendicular to the row traces over the dielectric or insulating pads with a top coat of a suitable conductor such as silver. Parallel to the column traces are short conductor leg traces. On the first side of the second substrate are deposited FSR elements such as patches of conductive material such as CNT. When the substrates are oriented parallel with the first sides in apposition, the patches of the conductive material align over a column trace and a short leg trace such that pressure on the membrane causes one or more conductive patches to engage a column trace and a short leg trace forming a force sensitive resistance circuit.

In an embodiment of the AFSR, the AFSR includes a generally planar first substrate having a conductor surface and an opposing touch surface; a plurality of parallel conductive traces on the conductive surface of the first substrate; an array of conductive patches oriented between adjacent parallel conductive traces and each patch is electrically connected to the conductive traces on the conductive surface of the first substrate; a generally planar second substrate having a conductor surface and an opposing touch surface; a plurality of parallel conductive traces on the conductive surface of the second substrate; an array of conductive patches oriented between adjacent parallel conductive traces and each patch is electrically connected to the conductive traces on the conductive surface of the second substrate; wherein the first substrate and the second substrate are oriented parallel to each other with the conductive surfaces of each substrate in apposition and the plurality of parallel conductive traces on the first substrate oriented perpendicular to the plurality of conductive traces on the second substrate; a plurality of insulating pads secured on the conductive traces on the first substrate where the perpendicular traces of the second substrate intersect the traces of the first substrate; and means for pre-loading the first and second substrate to create a pre-load force between the first and second substrate.

Referring to FIG. 3A, force sensing assembly 10 includes force sensor array 11 which is formed from one or more force sensing resistor assemblies such as FSR assemblies 12, 14, 16 and 18. Each FSR assembly is oriented between parallel rows of conductor traces on each substrate such as first traces 19 and second traces 21. FSR performance may be improved by including a highly conductive pad or patch between the substrate and each FSR patch.

A force sensing assembly may be formed using two parallel substrates such as first substrate 22 and second substrate 23 as illustrated in FIGS. 3B, 3C and 3D4. First substrate 22 has parallel conductive traces 19 printed along with a conductive leg such as leg 12A for each FSR assembly such as FSR assembly 12. Second substrate 23 has parallel conductive traces 21 printed along with a conductive leg such as leg 12B for each FSR assembly such as FSR assembly 12. When first substrate 22 and second substrate 23 are properly aligned with the deposited traces and patches in apposition, first conductive traces 19 are oriented perpendicular to second perpendicular traces 21. Near each conductive leg on each substrate, an FSR patch such as patch 24 and patch 25 are deposited. Insulating elements or pads such as insulator pads 26 are deposited on either substrate over the conductive traces at the points where the corresponding conductive trace on the other substrate would be in contact when the substrates are aligned in apposition as illustrated in FIGS. 3C and 3D. Insulating elements 26 separate the first conductors from the second conductors. Optional, highly conductive patches may be deposited between each FSR patch and the substrate that supports it. For example, highly conductive patches 24B and 25B may be deposited between FSR patches 24 and 25 and substrates 22 and 23 respectively.

Controlling the dynamic range, the measured resistance of an FSR circuit as a function of applied force on the sensor, is possible by controlling the size and texture of the conductive patches or electrodes as well as the spacing between the electrodes on the sensor substrates as well as the pre-load holding the substrates in contact without user input force. For example, using the aerosol jet deposition method to form the electrodes or patches, such as patches 24 and 25 of FIG. 3D, a second layer, layer 27, of small dots or dashes 27A or other shapes over the base conductor electrode may be applied in an effort to emulate the texture of a thick-film silver and FSR deposition. A thick-film FSR has a better dynamic range when used in conjunction with a thick-film silver electrode with few small conductive peaks or spots as opposed to using a "flat" copper trace. Having too many spots or peaks causes the electrode to behave similar to a smooth flat conductor. This contact state, or pre-load state may form the lower threshold for switch or sensor closure thus eliminating low contact noise and inconsistencies between sensors. Pre-loading an FSR also reduces the dynamic range of the sensor.

Referring now to FIG. 3D, first substrate 22 has first conductive traces such as traces 19A and 19B, conductive leg 12A and first FSR patch 24 deposited on a first surface such as conductor surface 22A. Second substrate 23 has second conductive traces such as traces 21A and 21B, conductive leg 12B and second FSR patch 25 deposited on a first surface such as conductor surface 23A. Each substrate has a corresponding second surface such as second surfaces 22B and 23B respectively. When two printed substrates are aligned in parallel, the first surfaces of each substrate are aligned in apposition with the parallel traces on each substrate oriented perpendicular to the conductive traces of the apposing substrate yielding a force sensing assembly such as force sensing assembly 10 with the second surfaces of each substrate operating as a contact surface for the application of force to be detected and measured.

In use, pressure on the second surfaces 22B or 23B of either first or second substrate at or near an FSR assembly such as FSR assembly 12 will create a force sensitive circuit such as circuit 30 of FIG. 3E that extends from first conductive trace 19A to second conductive trace 21A through the three resistive elements described below. First resistive element 32 is formed by the interaction of a portion of second FSR patch 25 with conductive leg 12A. Second resistive element 33 is formed by the interaction of a portion of first FSR patch 24 with second FSR patch 25. Third resistive element 34 is formed by the interaction of a portion of first FSR patch 24 with conductive leg 12B. The resistance value of each resistive element is proportional to the pressure applied to the substrate and the location of the pressure.

The disclosure of AFSR and FSR can be found in U.S. Pat. Nos. 4,489,302; 4,314,227; 9,599,525; and 9,903,771, which are herein incorporated by reference in their entirety.

In an embodiment of the system, the at least one radio field antenna is not generally limited, so long as the radio field antenna is capable of receiving a radio field tag code from a radio field tag brought into proximity to the inventory device. In an embodiment, the at least one radio field antenna includes an active radio field antenna, wherein the active radio field antenna is connected to or receives power from a power source and is capable of transmitting an interrogator radio signal to a radio field tag. In an embodiment of the system, an active radio field antenna can be coupled with a passive radio frequency identification tag, battery assisted radio frequency identification tag, an active radio frequency identification tag, or a passive nearfield tag. In an embodiment, the active radio field antenna can be coupled with a passive radio field tag, because the active radio field antenna can, if necessary, broadcast a radio signal strong enough to power or assist in powering the integrated circuit of the radio field tag, especially a passive radio field tag or a passive near field tag. In an embodiment, the at least one radio field antenna includes a passive radio field antenna, wherein the passive radio field antenna is not connected to a power source and is capable of receiving a radio frequency signal from an active radio field tag or a battery-assisted radio field tag. In an embodiment of the inventory device and system, the at least one radio field antenna is configured to, designed to, or capable of transmitting a radio signal having a frequency including from about 865 MHz to about 868 MHz (common in Europe), from about 902 MHz to about 928 MHz (common in North America), from about 125 MHz to about 134 kHz (low frequency), at about 13.56 MHz (high frequency and near-field), and/or from about 856 MHz to about 960 MHz.

In an embodiment of the system and the inventory device, the size and number of radio field antennas is not generally limited so long as at least one radio field antenna is located within range to receive a signal from the radio field tag, optionally, through a weighing surface. In an embodiment of the inventory device, the inventory device contains from 1, 2, 3, 4, 5, or 6 weighing surfaces, wherein the weighing surface(s) has at least one radio field antenna located in between the weighing surface and a bottom of the inventory device. One benefit of this embodiment can be that the inventory device can identify and weigh from 1, 2, 3, 4, 5, or 6 tagged inventory items simultaneously or in any sequence. In an embodiment of the inventory device, the length and width of a radio field antenna independently range from about 2 cm to about 30 cm, including from about 5 cm to about 20 cm. In an embodiment of the inventory device, the thickness of the radio field antenna ranges from about 1 mm to about 30 mm, including from about 2 mm to about 20 mm.

In an embodiment, the inventory device includes a weighing surface. The material and dimensions of the weighing surface are not generally limited so long as the material and dimensions of the weighing surface allow at least a portion of the weight (force exerted by gravity) of an inventory device to be transferred through the weighing surface to the array of force sensing resistors (AFSR) and permits a radio signal to pass through the material of the weighing surface. In an embodiment, the weighing surface can be an exterior membrane layer of the at least one force sensing array. In an embodiment, the weighing surface is part of the top of the inventory device. In an embodiment, the material of the weighing surface can be the same or different from the material of the top, bottom, or side of the inventory device. In an embodiment, the material of the weighing surface is a flexible polymer or rubber, including MYLAR®, neoprene, natural rubber, polybutadiene, polysiloxane, ethylene propylene diene monomer rubber, styrene butadiene, isobutylene isoprene, chlorosulfonated polyethylene, and the like.

In an embodiment of the inventory device, the length and width of the inventory device are not generally limited, so long as the tagged inventory item to be weighted and identified can be placed and/or stored on top of the inventory device. In an embodiment, the length and the width of the inventory device can each independently range from about 4 cm to about 200 cm, including from about 8 cm to about 90 cm. In an embodiment of the inventory device, the thickness of the inventory device can range from about 0.5 cm to about 5 cm, including from about 1 cm to about 3 cm. In an embodiment of the inventory device, the material of the top, bottom, side, and weighing surface of the inventory device can each independently be the same or different. In an embodiment, the top, bottom, and side of the inventory device can be a flexible or inflexible material, including a metal, a wood, a plastic, and/or a rubber, and the like. In an embodiment, the top, bottom, side, and weighing surface of the inventory device can be a single material such as a neoprene sleeve capable of containing the array of force sensing resistors and at least one radio field antenna. In an embodiment, the configuration of the top, bottom, side, and weighing surface of the inventory device are impermeable or resistant to the passage of liquids, especially water and aqueous mixtures. One benefit of a water proof or water resistant inventory device can be a resistance to damage from spills.

In an embodiment of the system and inventory device, a light source is located on an exterior of the inventory device, wherein the exterior of the device can include the top, bottom, or side of the device. The light source is not general limited so long as the light source is visible outside of the inventory device. In an embodiment, the light source is a light emitting diode (LED) or incandescent bulb. In an embodiment, the light source is configured to or capable of providing continuous light or a pattern of light, such as blinking. In an embodiment, the light source is configured to or capable of providing or contributing to ambient light outside of the device. In an embodiment, the light source is configured to or capable of indicating system status, such as indicating when the system is rebooting, a status of power on, a status of power off, or system processing, such as during the process of weighing and/or identifying a tagged inventory item.

In an embodiment, the inventory device has an array port connected by an array data wire to the array of force sensing resistors. In an embodiment, the inventory device has an antenna port connected by an antenna data wire to the at least one radio field antenna. In an embodiment, the inventory device has a power port which can be connected to the array of force sensing resistors and the at least one radio field antenna. In an embodiment, the array port and the antenna port can be any device capable of communicating electrical or optical signals, including computer ports, including a PS/2 connector, Parallel port, VGA port, Micro-DVI port, High Definition Media Interface, an Ethernet port (RJ-45 port), RJ-11, a serial port, or external Serial AT Attachment port, or a Universal Serial Bus (USB) port. In an embodiment, the power port can be any port capable of receiving AC or DC current, including one capable of connecting to and receiving power from a USB connector or a barrel jack power cable connector. In embodiment, the array port and antenna port are consolidated into a combined communication port. In an embodiment, at least one of the array port and the antenna port are consolidated with the power port to provide an ultra-port capable of passing signals and electrical current. In an embodiment, the ultra-port is a USB port. In an embodiment, at least one of the array port, the antenna port, the power port, the combined communication port, and ultra-port is located on the top, bottom, and/or side of the inventory device.

In an embodiment, the inventory device can include a sensor, including a temperature probe, such as a thermocouple or digital thermometer.

Figure 4:
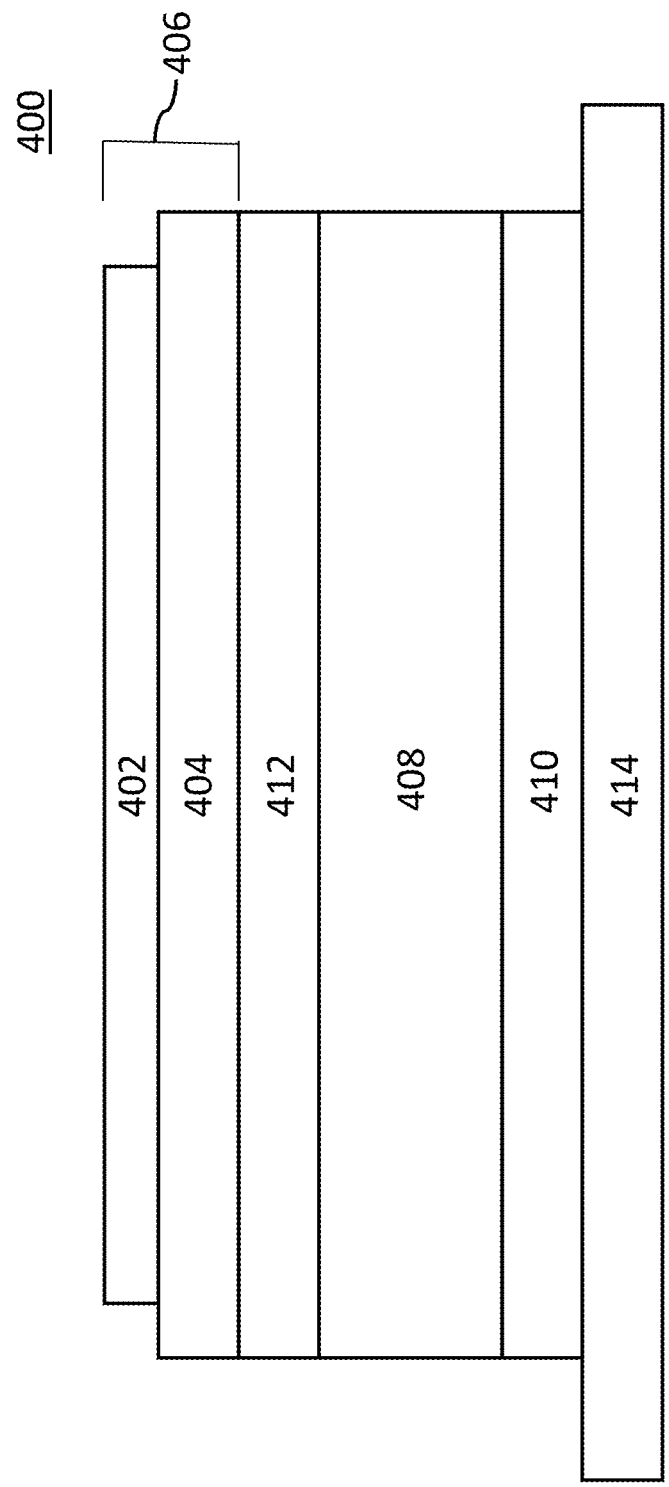
FIG. 4 is a schematic depiction of an embodiment of a radio field tag of the system, wherein the radio field tag is attached to an adhesive backing instead of an inventory item.

A radio field tag is disclosed herein. Referring to FIG. 4, in an embodiment, the system includes a radio field tag 400. In an embodiment, the radio field tag 400 includes an item adhesive layer 410 and an integrated circuit layer 406, wherein the integrated circuit layer 406 includes an integrated circuit 402 and, optionally, an integrated circuit support 404. In an embodiment, the radio field tag 400 includes a concentrating layer 408 between the integrated circuit layer 406 and the item adhesive layer 412. In an embodiment, the radio field tag 400 includes a circuit adhesive layer 412, wherein the circuit adhesive layer 412 attaches, directly or indirectly, at least a portion of the integrated circuit layer 406 to a least a portion of the concentrating layer 408. In an embodiment, the radio field tag 400 includes an item adhesive layer 410, wherein the item adhesive layer 410 attaches, directly or indirectly, at least a portion of the concentrating layer 408 to at least a portion of the adhesive backing 414 or an inventory item (not shown in FIG. 4). In an embodiment, the radio field tag 400 includes the following layers in order: an integrated circuit layer 406, a circuit adhesive layer 412, a concentrating layer 408, and an item adhesive layer 410, wherein each layer is directly or indirectly in contact with an adjacent layer, if any.

In an embodiment of the system, the radio field tag is a passive radio frequency identification tag, a battery assisted radio frequency identification tag, an active radio frequency identification tag, or a passive nearfield tag. In an embodiment, the radio frequency tag is a passive radio field tag, wherein the integrated circuit of the radio field tag is not connected to a power source and is capable of using a radio signal from the at least one radio field antenna to charge up and transmit a radio field identification code. In an embodiment, the radio field tag is a battery assisted radio frequency tag, wherein the integrated circuit of the battery assisted radio frequency tag has access to or is connected to a battery power source, and is capable of drawing sufficient charge from the battery and/or the radio signal from the radio field antenna to charge up and transmit a radio field identification code. In an embodiment of the radio field tag, the radio field tag is an active radio frequency tag, wherein integrated circuit of the active radio frequency tag has access to or is connected to a non-battery power source and is capable of drawing sufficient charge from the non-battery power source and/or the radio signal from the at least one radio field antenna to charge up and transmit a radio field identification code to the at least one radio field antenna. One benefit of a passive radio frequency tag can be the low cost of the tags. In an embodiment, the radio field tag includes a passive radio frequency tag, which includes a commercially available radio frequency identification tag. One benefit of a battery assisted radio frequency tag and an active radio frequency tag can be an increased detection range for transmitting the radio field identification code. In an embodiment of the radio field tag, the integrated circuit is a near field compatible radio frequency tag functioning at or capable of transmitting a radio field identification code at about 13.56 MHz. One benefit of a near field compatible radio frequency tag can be its compatibility with cell phone technology.

In an embodiment, the system includes a radio field tag code. In an embodiment, the radio field tag code is or includes a radio frequency identification code. In an embodiment, the radio frequency identification code is transmitted from the radio field tag to the radio field antenna. In an embodiment, the radio field tag code or radio frequency identification code is a unique code. In an embodiment, the radio field tag code or radio frequency identification code is a non-unique code that can be applied to a type of inventory item.

In an embodiment, the radio field tag includes a circuit adhesive layer. The circuit adhesive layer is not limited so long as the circuit adhesive layer attaches at least a portion of the integrated circuit layer to a least a portion of the concentrating layer and does not prevent the integrated circuit from transmitting a radio field tag code. Suitable adhesives for the circuit adhesive layer include cyanoacrylates, silicone resins, polyimides, and combinations or mixtures thereof. A benefit of the circuit adhesive layer can be reducing manufacturing costs by allowing the integrated circuit layer and concentration layer to be separately manufactured and/or commercially purchased before adhering the integrated circuit layer to the concentration layer.

In an embodiment, the radio field tag includes an item adhesive layer. The item adhesive layer is not limited so long as the item adhesive layer attaches at least a portion of the concentrating layer to a least a portion of the inventory item, forming a tagged inventory item, and does not prevent the integrated circuit from transmitting a radio field tag code. Suitable adhesives for the item adhesive layer include an epoxy, a polyurethane, a cyanoacrylate, a silicone resin, a polyimide, and acrylic polymer, and combinations or mixtures thereof. In an embodiment, the item adhesive layer includes a permanent adhesive, wherein the permanent adhesive is a formulation known in the art to be difficult to remove without damaging the radio field tag. One benefit of the item adhesive layer can be the difficulty of accidently removing the label when the tagged inventory item, including a vessel, is handled repeatedly. Another benefit of the item adhesive layer can be the difficulty of switching the labels, which could prevent or reduce theft of the inventory item.

In an embodiment, the radio field tag includes an integrated circuit support. In an embodiment, the integrated circuit layer includes an integrated circuit support. The integrated circuit support is not limited so long as it allows for the integrated circuit to be attached, directly or indirectly, to the concentrating layer and does not prevent the integrated circuit from transmitting a radio field tag code. Suitable materials include paper and/or plastic products.

In an embodiment, the radio field tag includes a concentrating layer. In an embodiment, the radio field tag includes an item adhesive layer, a concentrating layer, and an integrated circuit layer. In an embodiment, the concentrating layer is in contact, directly or indirectly, with and located between the item adhesive layer and the integrated circuit layer. The concentrating layer is not generally limited so long as the concentrating layer at least partially separates the item adhesive layer from the integrated circuit layer. It has been discovered that where the tagged inventory item is a vessel containing a liquid, directly attaching the integrated circuit and/or integrated circuit layer to the item adhesive layer without the concentrating layer resulted in poor reception of the radio field tag code. It is believed that this poor reception is due, at least in part, to the dissipation of the radio signal into the liquid content of the vessel. In has been discovered that this problem can be eliminated or reduced by including a concentrating layer at least partially between the integrated circuit and the item adhesive layer. In an embodiment, the concentrating layer includes a radio signal enhancing material. Suitable radio signal enhancing materials includes a solid foam, such as a polystyrofoam, a foam rubber, a silicone foam, a polyurethane foam, or a combination thereof. In an embodiment, the concentrating layer enhances an amount of radio signal from the radio field tag to the at least one radio field antenna relative to a radio field tag without the concentrating layer. In an embodiment, the concentrating layer reduces the amount of power needed by the integrated circuit and/or the radio field antenna to transmit a radio field tag code from the integrated circuit to the at least one radio field antenna. One benefit of the concentrating layer can be quicker transmission of the radio field tag code, allowing for an increased distance between a tagged inventory item and an inventory device during code transmission. One benefit of the concentrating layer can be decreasing power consumption of the inventory device and/or radio field tag during use.

In an embodiment, the radio field tag includes an adhesive backing. In an embodiment, the radio field tag excludes an adhesive backing. The adhesive backing is not generally limited so long as the adhesive backing can be removed from the item adhesive layer without damaging one or more of the other layers of the radio field tag. Suitable materials includes wax paper and the like. A benefit of the adhesive backing can be that it allows for the radio field tag to be shipped without accidental adhesion of the item adhesion layer to an item other than an inventory item. Another benefit of the adhesive backing can be that it allows a user to quickly and easily remove the adhesive backing without damaging any other layer of the radio field tag, and to attach the radio field tag to an inventory item as with any other inventory sticker.

In an embodiment, the radio field tag includes an integrated circuit, a concentrating layer, and an item adhesive layer, wherein the in integrated circuit attaches, directly or indirectly, to the concentrating layer.

In an embodiment of the system, the system includes a tagged inventory item. In embodiment, the tagged inventory item includes a radio field tag, without an adhesive backing, attached to an inventory item. In an embodiment, the inventory item or tagged inventory item is a package or vessel containing an amount of content. In an embodiment, the inventory item or tagged inventory item is an opened package or opened vessel containing an amount of content. In an embodiment, the vessel or opened vessel includes a solid, a liquid, a slurry, a particulate, or a combination thereof. One benefit of the system can be determining or measuring an amount of content in a vessel or opened vessel, where the content varies due to an increase or decrease of an amount of the content. For example, if the tagged inventory item includes a vessel or opened vessel containing an amount of liquid, such as an alcoholic beverage, then an amount of content can be measured at various times to track the amount of content as the various amounts of content are removed over time and use. Unless otherwise noted, an "opened package" or "opened vessel" refers to a package or vessel, respectively, where at least one seal is broken, such that an amount of content of the package or vessel can be removed.

Figure 5:
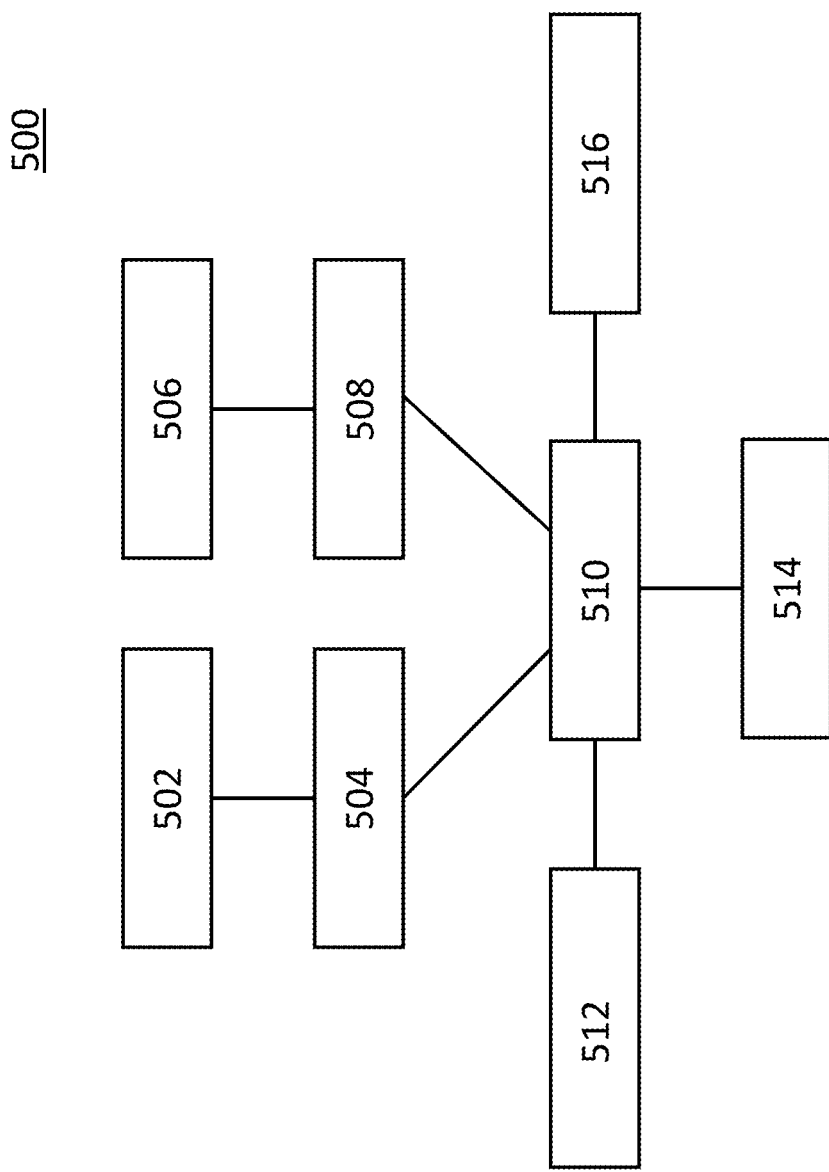
FIG. 5 is a diagram of an embodiment of the system.

Referring to FIG. 5, in an embodiment, the system 500 can include an inventory item 502, an array of force sensing resistors 504, a radio field tag 506, at least one radio field antenna 508, a system processor 510, and at least one of a database 512, a network 514, and the display 516. In an embodiment, an array of force sensing resistors 504 are configured to, capable of, or positioned to detect and/or measure a weight of the inventory item 502. In an embodiment, the at least one radio field antenna 508 is configured to, capable of, or positioned to receive a radio field tag code from the radio field tag. In an embodiment, the at least one radio field antenna is configured to or capable of communicating with a system processor 510. In an embodiment, the array of force sensing resistors is configured to or capable of communicating with a system processor 510. In an embodiment, the system processor 510 is configured to, connected to, or capable of communicating with at least one of a data base 512, a network 514, and a display 516, or a combination thereof.

In an embodiment, the system includes a system processor. The system processor is not generally limited so long as the system processor allow for the processing of signals, including at least one of a measurement time, a measurement date, a radio field tag code, a tagged inventory item identity, a temperature, a weight, and an inventory device code, according to a software program. Suitable system processors include any electronic circuitry capable of carrying out the instructions of a software program by performing basic arithmetic, logical, control and/or input/output (I/O) operations specified by the program. Suitable system processors can be found in computers, desktop, laptops, registers, tablets, cellphones, and the like. In an embodiment, the system processor is configured to or capable of communicating with the array of force sensing resistors and/or at least one radio field antenna through a wired or wireless communication system. The communication system is not generally limited so long as it allows for data to be transmitted from the array of force sensing resistors and/or at least one radio field antenna to the system processor. Suitable communication system, include a data cable, including a USB cable, and/or a wireless technology, including mobile broadband, Wi-Fi, or Bluetooth devices.

In an embodiment, the system includes a database. The data base is not generally limited so long as the data base allows for the storage of data, including reading and writing data, and for that data to be accessed electronically. In an embodiment, the data base includes a hard drive, a flash drive, or a network drive. In an embodiment, the data base stores data, including at least one of a measurement time, a measurement date, a radio field tag code, a tagged inventory item identity, a temperature, a weight, and an inventory device code.

In an embodiment, the system includes a network. The network is not generally limited so long as the network allows for data to be communicated, processed, and stored remotely through an internet or an intranet. Suitable networks include commercially available cloud-computing platforms and services. One benefit of a network is that the system can pass data to a cloud based platform, where the data can be monitored, analyzed, and/or acted on. For example, a cloud based program can monitor inventory, capture sales data, and reorder inventory items in real time.

In an embodiment, the system includes a display. The display is not generally limited so long as the display allows for data from the system processor to be electronically shown or depicted on a screen. Suitable displays include a computer display, a television, a laptop screen, a cell phone screen, a tablet screen, or the screen of any electronic imaging device.

A method is disclosed herein. In an embodiment, the method includes an inventory method. In an embodiment, the inventory method includes monitoring an inventory of multiple tagged inventory items on multiple inventory devices, optionally, in real time. In an embodiment, the method includes providing or obtaining a system as described above.

Figure 6:
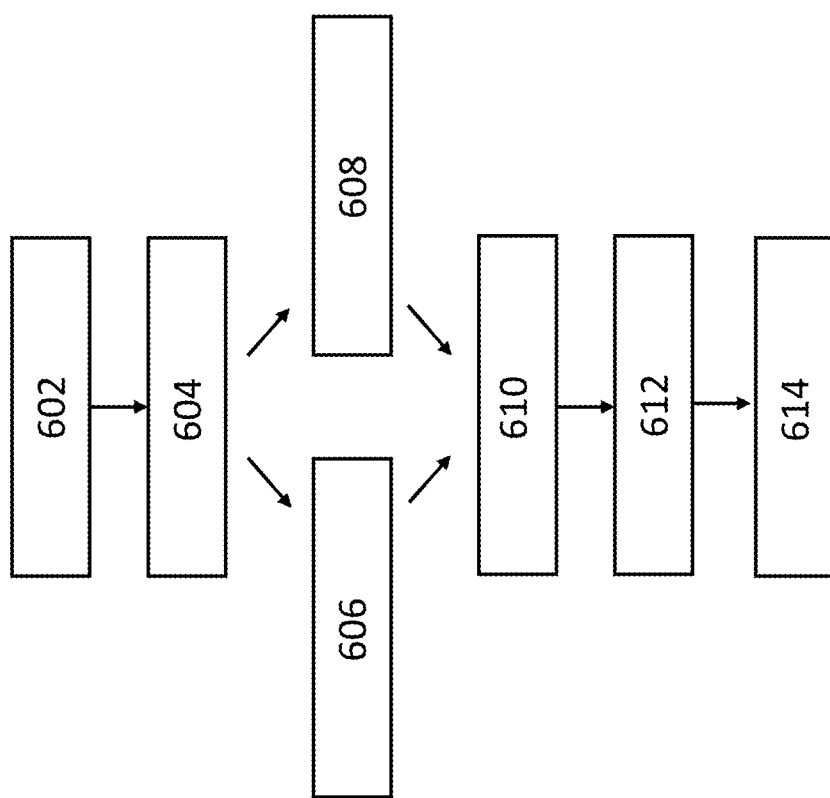
FIG. 6 is a flow diagram of an embodiment of a method.

Referring to FIG. 6, in an embodiment, the method includes 602 detecting a weight change when a tagged inventory item is placed into contact with or on top of the weighing surface; and 604 turning on or powering up the at least one radio field antenna in response to the detected weight change. In an embodiment, the method includes 606 measuring a weight of the tagged inventory item and 608 identifying the tagged inventory item by the at least one radio field antenna, simultaneously or in any order. In an embodiment, the method includes 610 transmitting at least one of a weight and a radio field tag code to the system processor. In an embodiment, the weight is transmitted from the array of force sensing resistors. In an embodiment, the radio field tag code is transmitted from the at least one radio field antenna. In an embodiment, the method includes 612 transmitting at least one of a measurement time, a measurement date, a radio field tag code, a tagged inventory item identity, a temperature, a weight, and an inventory device code from the system processor to at least one of the database, the network, and the display. In an embodiment, the method includes 614 turning off or powering down the at least one radio field antenna after communicating or transmitting a radio field tag code to the system processor.

In an embodiment, the method includes attaching a radio field tag to a surface of an inventory item, forming a tagged inventory item. In an embodiment, the method includes attaching a radio field tag to a surface of an inventory item before, during, or after the item is added to inventory. In an embodiment, the method includes attaching a radio field tag to a surface of an inventory item before, during, or after the inventory item is opened, forming an tagged inventory item, including an opened tagged inventory item. In an embodiment, the method includes opening a tagged inventory item to remove an amount of content.

In an embodiment, a plurality of tagged inventory items are stored on a plurality of inventory devices for a duration of from minutes to years. In an embodiment, the method includes removing a tagged inventory item from the inventory device. In an embodiment, the method includes removing or adding an amount of content to the tagged inventory item. In an embodiment, the method includes removing or adding an amount of content from the tagged inventory item, while the tagged inventory item remains on the inventory device. One benefit of the method disclosed herein can be maintaining, tracking, or monitoring an inventory in real time by monitoring a plurality of tagged inventory items stored on a plurality of inventory devices.

In an embodiment, the method include placing a tagged inventory item on an inventory device. In an embodiment, the method includes the array of force sensing resistors detecting a weight change. In an embodiment, the method includes the array of force sensing resistors transmitting or communicating at least one of a weight, a time, and an inventory device code from the array of force sensing resistors to the system processor. In an embodiment, the system processor accesses the data based to detect or determine if the measured weight differs from the last previous weight that corresponds to the last tagged inventory item from the corresponding inventory device. If no weight change is detected, then the system processor remains idle or takes no further action. If a weight change is detected, then the system processor transmits a signal to the inventory device, turning on or powering up the at least one radio field antenna. In an embodiment of the method, the weight change can include about 25.0 g to about 45.0 kg, including from about 50.0 g to about 40.0 kg, including from about 75 g to about 35 kg. In an embodiment of the method, the system processor can transmit a signal to the at least one radio field antenna, turning off the radio field antenna. One benefit of an embodiment of the system and method disclosed herein can be that the at least one radio field antenna is turned on during from about 1 s to about 5 min after a weight change is detected, instead of remaining on. One benefit of an embodiment of the system and method disclosed herein can be that the at least one radio field antenna is turned off by the system processor from about 1 s to about 5 min after weighing the tagged inventory item, instead of remaining on. This benefit can reduce power consumption when tagged inventory items are stored on inventory devices without weight change for long periods of time.

In an embodiment, the method includes accessing the database and determining the location of a tagged inventory item on an inventory device. In an embodiment, the method includes selecting one or more tagged inventory items, optionally on a display, and the system processor transmitting a signal to the one or more corresponding inventory devices, turning on or changing the pattern of luminescence of the light source on the exterior of the inventory device.

It is understood that the data transmitted to the system processor and network can be further processed and analyzed for monitoring theft, customer consumption trends, profit trends, reordering and delivery schedules and the like.

In more detail,

Embodiment 1

A system comprising: a tagged inventory item, wherein the tagged inventory item includes a radio field tag attached to an inventory item; and an inventory device, wherein the inventory device includes a weighing surface, an array of force sensing resistors, and at least one radio field antenna, wherein the array of force sensing resistors and the at least one radio field antenna are configured to weigh and identify the tagged inventory item through the weighing surface.

Embodiment 2

The system of any one of embodiments 1, 3-5 and 7-8, wherein the radio field tag includes an item adhesive layer, a concentrating layer, and an integrated circuit layer, and wherein the concentrating layer is in contact with and located between the item adhesive layer and the integrated circuit layer.

Embodiment 3

The system of any one of embodiments 1-2, 4-5, and 7-8, wherein the radio field tag is a passive radio frequency identification tag, a battery assisted radio frequency identification tag, an active radio frequency identification tag, or a passive nearfield tag;

wherein the at least one radio field antenna includes an active radio field antenna or a passive radio field antenna.

Embodiment 4

The system of any one of embodiments 1-3, 5, and 7-8, wherein the concentrating layer includes a radio signal enhancing material.

Embodiment 5

The system of any one of embodiments 1-4, and 7-8, wherein the inventory device includes a top and a bottom, wherein the top of the inventory device includes the weighing surface, and the array of force sensing resistors and the at least one radio field antenna are located between the top and the bottom of the inventory device.

Embodiment 6

The system of embodiment 5, wherein the array of force sensing resistors is closer to the top of the inventory device than the at least one radio field antenna, and optionally, the array of force sensing resistors is in contact with the top of the inventory device.

Embodiment 7

The system of any one of embodiments 1-5, and 8, wherein the array of force sensing resistors and the at least one radio field antenna are configured to communicate with a system processor, and wherein the system processor is configured to communicate with at least one of a database, a display, and a network.

Embodiment 8

The system of any one of embodiments 1-5, and 7, wherein the inventory item includes a vessel containing an amount of content, wherein the content includes a solid, a liquid, a slurry, a particulate, or a combination thereof.

Embodiment 9

The system of embodiment 2, wherein the inventory item includes a vessel containing an amount of content, wherein the content includes a solid, a liquid, a slurry, a particulate, or a combination thereof; and wherein the concentrating layer enhances an amount of radio signal from radio field tag to the at least one radio field antenna.

Embodiment 10

A method comprising: providing a system that includes; a tagged inventory item, wherein the tagged inventory item includes an radio field tag attached to an inventory item; and an inventory device, wherein the inventory device includes a weighing surface, an array of force sensing resistors, and at least one radio field antenna, wherein the array of force sensing resistors and the at least one radio field antenna are configured to weigh and identify the tagged inventory item through the weighing surface; detecting a weight change of from about 25.0 g to about 45.0 kg when the tagged inventory item is placed into contact with the weighing surface of the inventory device; measuring a weight of the tagged inventory item; and identifying the tagged inventory item by turning on the at least one radio field antenna.

Embodiment 11

The method of any one of embodiments 10, and 12-15, wherein the array of force sensing resistors and the at least one radio field antenna are configured to communicate with a system processor, wherein the system processor is configured to communicate with at least one of a database, a network, and a display.

Embodiment 12

The method of any one of embodiments 10-11, and 13-15, the method further comprising: transmitting at least one of a measurement time, a measurement date, a radio field tag code, a tagged inventory item identity, a temperature, a weight, and an inventory device code from the system processor to at least one of the database, the network, and the display.

Embodiment 13

The method of any one of embodiments 10-12 and 14-15, wherein the at least one radio field antenna is turned on in response to the array of force sensing resistors detecting the weight change of from about 25.0 g to about 45.0 kg.

Embodiment 14

The method of any one of embodiments 10-13 and 15, further comprising: turning off the at least one radio field antenna after communicating a radio field tag code to a system processor.

Embodiment 15

The method of any one of embodiments 10-14, wherein the inventory item includes a vessel containing an amount content, wherein the content includes a solid, a liquid, a slurry, a particulate, or a combination thereof.

In even more detail,

In an embodiment, the present disclosure relates generally to a system and method for inventory. In an embodiment, the present disclosure is a system and method for inventory that detects, tracks, and characterizes inventory items and transactions.

In an embodiment, the present disclosure is a system and method of detecting, tracking, and characterizing inventory items and inventory transactions at single or multiple locations in which a group of sensor arrays containing one or more sensing modalities is utilized to detect the identity and location of an item when it is placed in contact with the sensor array.

In an embodiment, the present disclosure is a system and method of detecting, tracking, and characterizing inventory items and inventory transactions at single or multiple locations in which a group of sensor arrays containing one or more sensing modalities is utilized to detect the identity and location of an item when it is placed in contact with the sensor array. In an embodiment, the data from the sensor array is transmitted to a processing system where time information is collected along with the location and identity data. In an embodiment, the processing system will operate a program that will use the location and identity data to collect characteristics of the located item from sensors within the sensor array. In an embodiment, the data collected is sent to a local or remote data storage for use in generating inventory location reports, monitoring reports, alarms, and usage tracking reports from single or multiple locations.

In an embodiment, the system can track, locate, and characterize an inventory item. In an embodiment, a remotely readable identification tag is affixed, printed, or included on the inventory item. In an embodiment, the identification is uniquely matched to the inventory item and registered to a database through a data collection system using bar code, RF, or other tag readers appropriate for the identification tag technology.

In an embodiment, to track, locate, and characterize the inventory item, the areas where the inventory item will be equipped with a sensory array assembly. In an embodiment, the tracking, locating, and characterizing of the inventory item is achieved when the inventory item is placed on the sensory array assembly. In an embodiment, the sensory array assembly detects, locates, and measures items placed on its surface by detecting the pressure pattern applied by an inventory item placed on the pad. In an embodiment, the pad contains an array of pressure sensors utilizing capacitive or resistive pressure sensing technology. In an embodiment, when an inventory item is placed on the sensory array assembly, the pressure sensor array detects the shape and weight of inventory items. In an embodiment, the shape is used to identify and locate the inventory item. In an embodiment, the weight is used to measure the weight of the inventory item.

In an embodiment, the sensory array contains an array of non-contacting identification detectors such as RFID, NFC, or bar code. In an embodiment, the detection of the inventory item and the determination of the location of the inventory item by the pressure sensor array is used to detect the unique identification tag of the inventory item by using trigger the nearest remote reader located in the sensory array assembly to "read" the identification tag. In an embodiment, event data consisting of the event time, unique identification number, location, pressure profile, and weight is transmitted to a database for storage and analysis.

In an embodiment, the database will collect tracking data for each unique inventory item. In an embodiment, starting with the initial pressure pattern and weight, the location and weight of the inventory item over time can be tracked. In an embodiment, the user will be able to determine instantaneous location and weight of individual inventory items and groups of inventory items. In an embodiment, the placement and removal of inventory items from the pad can be used to track inventory events over time and trigger processing and analysis functions. In an embodiment, the database can also output inventory usage data to point of sale and automated ordering systems.

Embodiment 21

In an embodiment, an inventory tracking system comprising: a physical platform containing multiple layers of sensing arrays to detect, locate and characterize an object placed on the platform; a data collection device to receive detected signals from the sensing arrays; a processing system to collect, time tag, package and transmit the array data as object transaction information; a remote data storage and processing center to generate reports on the status of an inventory item a group of inventory items, a location, or group of locations.

Embodiment 22

The method of embodiment 21, wherein: the pressure sensor array layer in the platform detects the pressure of an inventory object when the object is placed on the platform. The data collection device provides pressure array information to the processor system. The processing system recognizes changes in the pressure array signals as an inventory object that has been placed on the platform and triggers a new inventory object transaction. The processing system uses the pressure sensor array data to determine the location of the object and activates the nearest RFID sensor in the antenna array layer of the platform. The identification code of the RFID tag attached to the inventory object is collected. The processing system combines the pressure sensor array data, location, and RFID tag with time data to generate an inventory object transaction and transmits the transaction data to a remote data storage and processing center. The data storage and processing center collects and analyzes transaction data transmitted from a network of processing systems. The location and location change history of an inventory object can be tracked as the inventory object is placed in various locations within a platform or between platforms. The pressure profile and or weight data of an inventory object or group of inventory objects is determined over time to track the change in pressure profile or weight of an inventory object.

Embodiment 23

The method of embodiment 22, wherein: the system is used to track inventory object consisting of RFID tagged containers of liquids in installation locations that may contain any number of platforms. The processing system and or the data storage and processing center collects registration data that assigns the inventory object's description to the unique RFID tag number of each container. The platforms are used to hold RFID tagged containers of liquids. The processing system detects the location, identification, and weight of a container when the container is placed to the platform. Time tracked data is collected each time the container is replaced on any location on any platform. The data storage and processing center uses the transaction data from the processing systems at each installed location to generate liquid usage reports that can be provided to the user either by individual container, by groups of containers, by platform, by installation location, or by region.

Embodiment 24

The method of embodiment 23 wherein: RFIDs carried by either operators or devices that remove and replace liquid containers are detected by the antenna sensor array in the platform. The identity of the operator or device is included in the inventory transaction data. The processing system and or the data storage and processing center can generate usage reports by operator or device for performance, billing purposes.

Embodiment 25

The method of embodiment 24 wherein: the platform is concealed within a surface for tracking inventory object changes in location and pressure profile in a clandestine manner.

Embodiment 26

The method of embodiment 25 wherein: the platform is concealed within a surface for tracking inventory object changes in location and pressure profile by operator or device in a clandestine manner.

Embodiment 27

The method of embodiment 26, wherein: the platform is located within a large temperature controlled oven, freezer, or refrigerator. The pressure sensor array layer in the platform detects the pressure of an inventory object when the object is placed on the platform. The data collection device provides pressure array information to the processor system. The processing system recognizes changes in the pressure array signals as an inventory object that has been placed on the platform and triggers a new inventory object transaction. The processing system uses the pressure sensor array data to determine the location of the object and activates the nearest RFID sensor in the antenna array layer of the platform and the nearest temperature sensor in the temperature sensor array layer of the platform. The identification code of the RFID tag attached to the inventory object is collected. The processing system combines the temperature, location, and RFID tag with time data to generate an inventory object transaction and transmits the transaction data to a remote data storage and processing center. The processor and or the data storage and processing center will periodically collect the temperature data from each of the inventory items. The data storage and processing center collects and analyzes transaction data transmitted from a network of processing systems. The location and temperature of an inventory object can be tracked as the inventory object is placed in various locations within a platform or between platforms. The temperature data of an inventory object or group of inventory objects is determined over time to track the change in temperature of an inventory object.

Embodiment 28

The method of embodiment 27, wherein: the temperature of products being baked in a large oven is monitored. RFID tags are applied to the baking container on placed within the baking container. The type of product and its baking parameters are assigned to the RFID when the container is filled and registered prior to baking. If products are moved within the oven the platform will track the location utilize the nearest temperature sensor in the temperature sensor array. The operator will receive a notification when an individual product has completed the baking cycle including the location to aid in removing the product that has completed baking from the oven.

EXAMPLES

Figure 7:
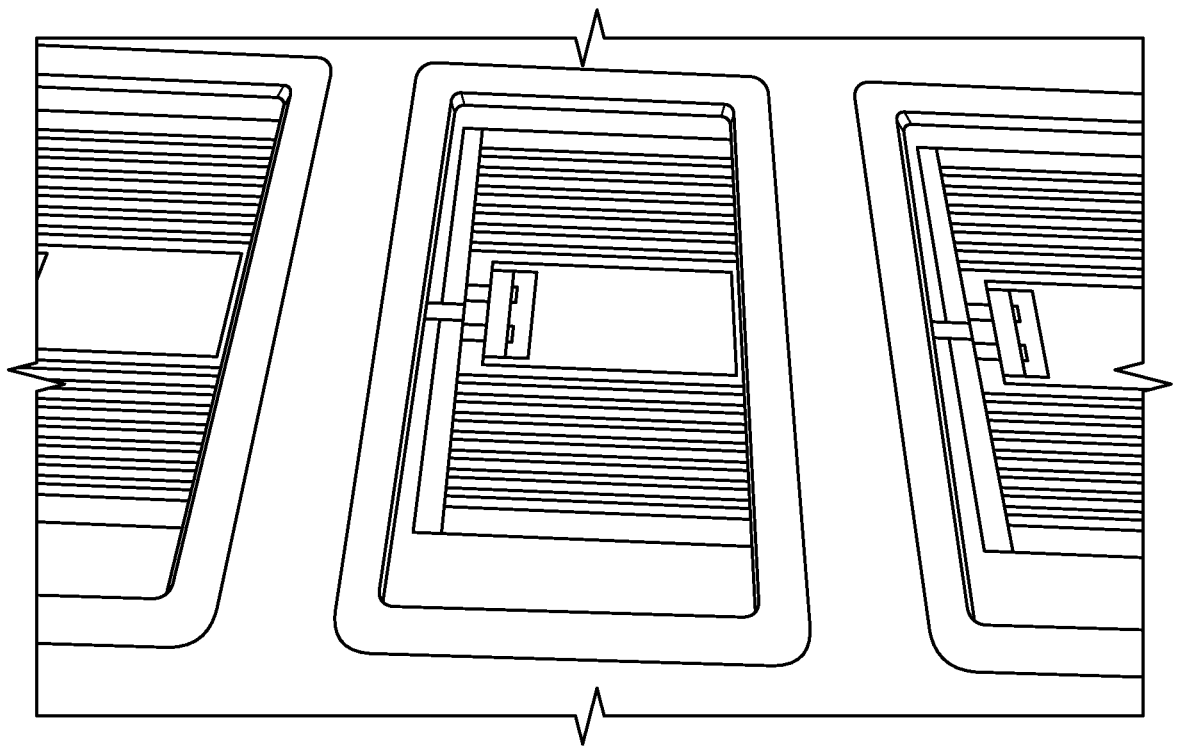
FIG. 7 is a photograph of an embodiment of a prototype of an integrated circuit layer.
Figure 10:
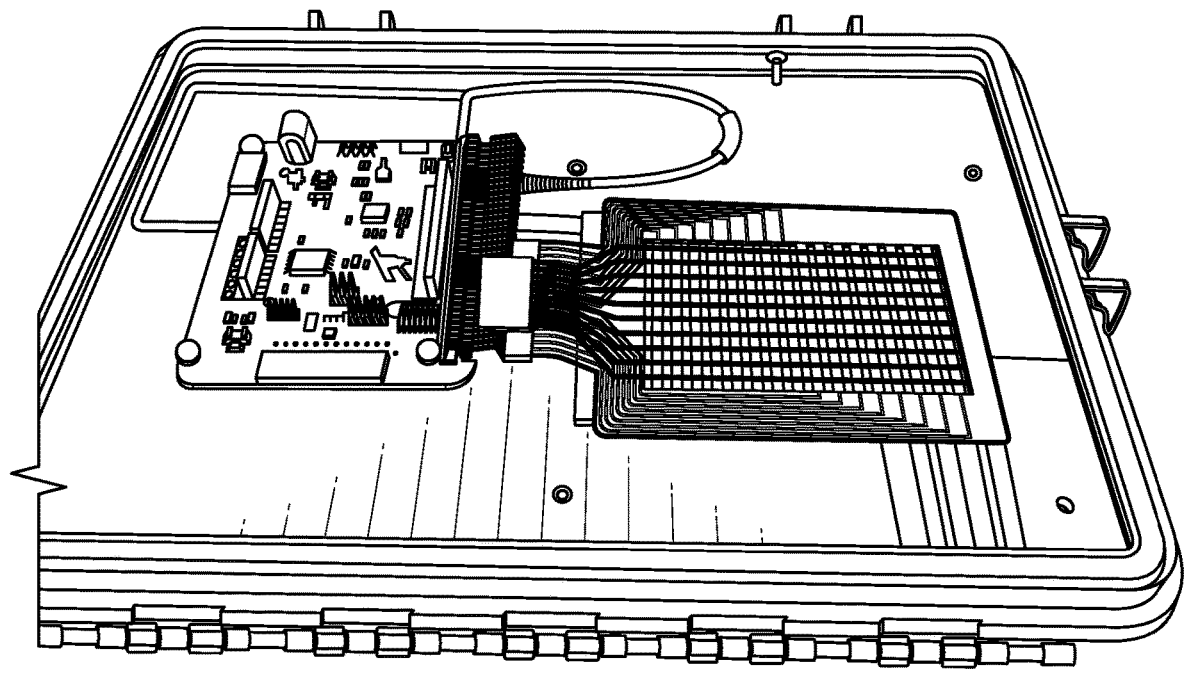
FIG. 10 is a photograph of an embodiment of a working prototype of an array of force sensing sensors on top of at least one radio field antenna.

Functional Components
Identification Tag
  RFID Tags, such as the ALIEN® PEARL™ (PE) shown in FIG. 7, are commercially purchased from Starport Technologies (Kansas City, Mo.).
  A Foam Adhesive, such as SCOTCH® Foam Mounting Tape, is commercially purchased from 3M® (Maplewood, Minn.).
Pressure Sensing
  An FSR Array, such as the Thru Mode FSR Matrix Array shown in the right hand side of FIG. 10, is commercially purchased from SENSITRONICS, LLC® (Bow, Wash.).
  An FSR to USB Interface, such as the MP2508 or Snowboard 2, shown in the left hand side of FIG. 10, can be commercially purchased from Kitronyx (Seoul, Korea).
Identification Sensor
  An OmniDirectional RFID Antenna, such as the CAF95956 can be commercially purchased from LAIRD TECHNOLOGIES® (Chesterfield, Mo.).
  An RFID Reader, such as the ThingMagic USB Pro can be commercially purchased from JADAK TECHNOLOGIES® (North Syracuse, N.Y.)
Client Platform
  A Laptop PC can be commercially purchased. (HP® INTEL® CORE™ i7 Laptop PC M6-W105DX HEWLETT PACKARD®, INC; Palo Alto Calif.)
  ARDUINO® Snowboard Interface Software can be commercially purchased from Kitronyx (Seoul, Korea).
  Snowforce Application Software can be commercially purchased from Kitronyx (Seoul, Korea).
  ThingMagic Universal Reader Assistant Software can be commercially purchased from JADAK TECHNOLOGIES® (North Syracuse, N.Y.).
  Spreadsheet Software (MICROSOFT® Office 360 EXCEL® can be commercially purchased from MICROSOFT® (Redmond, Wash.).

Experimental

A proof of concept experimental preparation can be made from available materials. The experimental preparation can perform the functions of pressure mapping, identification, and processing. The components of the sensor mat are stacked as described in embodiments herein for the purpose of detecting the pressure pattern and identification of a tagged inventory item. The output of the sensor mat is connected to the Client Platform using USB interfaces.

The pressure pattern detection can be accomplished using a FSR Array connected to a USB interface. The FSR array to USB interface output is provided to the Client Platform through the USB interface.

The identification detection can be accomplished using an OmniDirectional RFID Antenna connected to an RFID Reader. The RFID Reader output is provided to the Client Platform using a USB interface.

The sensor mat can be realized by attaching the FSR array to the top of the RFID antenna. The FSR array is connected to the FSR array to USB Interface. The RFID antenna is connected the RFID reader. Both the FSR array to USB Interface and the RFID reader are connected to the Client Platform.

Processing of the pressure array and RFID data is performed by the Client Platform. The Client Platform can be implemented using a Laptop PC with a Windows 10 Operating System. The pressure data can be read on the Client Platform using Arduino Snowboard Interface Software with Snowforce Application Software. The RFID data can be read on the Client Platform using ThingMagic Universal Reader Assistant Software. Numeric preparation of the data and database functions can be performed using Spreadsheet Software.

Figure 8:
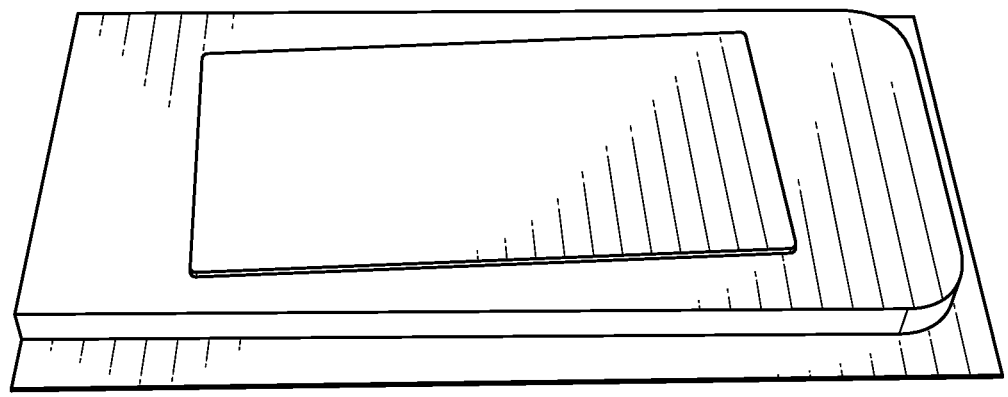
FIG. 8 is a photograph of an embodiment of a prototype of a radio field tag attached to an adhesive backing instead of an inventory item.
Figure 9:
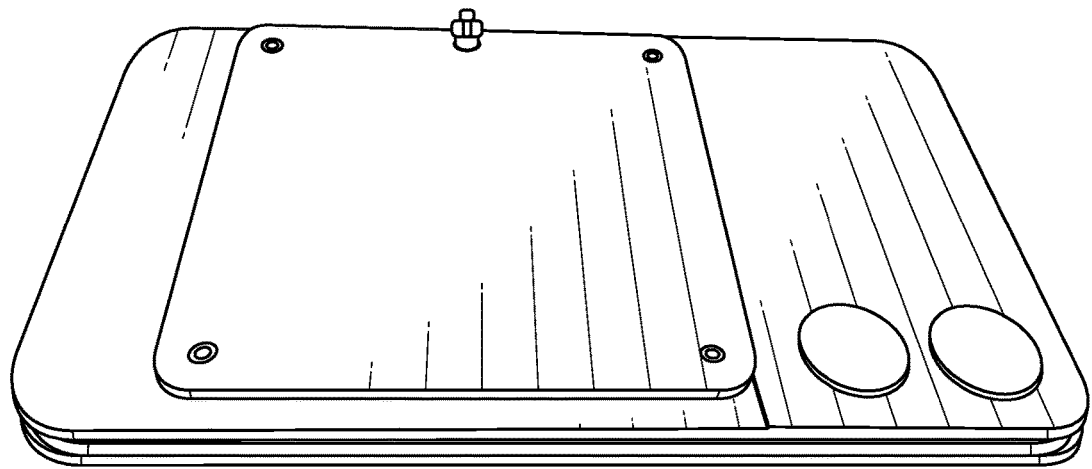
FIG. 9 is a photograph of an embodiment of a prototype of a radio field antenna.

The inventory item tag can be prepared by applying an RFID tag that can be attached to an inventory item using foam mounting tape to provide an embodiment of a radio field tag, as shown in FIG. 8.

The experiment is conducted to demonstrate that a tagged inventory item can be identified and associated with its pressure pattern for the purposes of tracking the identification and weight of a tagged inventory item over time. An identification tag is prepared by preprogramming an inventory item tag with a unique test identification code. The programmed tag is applied to the bottom surface of an inventory item containing liquid. The inventory item is placed on the sensor mat. The FSR array detects the pressure pattern of the inventory item and a data array is calculated by the Snowforce Application Software. The data from the identification tag is read by the RFID reader and is transferred to the Universal Reader Assistant Software. A test reading entry is made in the spreadsheet software by combining the RFID reader identification data with the Snowboard Application Software pressure array data and attaching the time. The data entry is added to a sample database in the spreadsheet software. The experiment continues by removing liquid from the inventory item and taking additional readings. Various inventory related information can be calculated by processing the information in the database.

What is claimed is:
1. A system comprising:
  a tagged inventory item, wherein the tagged inventory item includes a radio field tag attached to an inventory item; and
  an inventory device, wherein the inventory device includes a weighing surface, an array of force sensing resistors, and at least one radio field antenna,
  wherein the inventory device includes a top, a bottom, and a side, wherein the top of the inventory device includes the weighing surface, wherein the weighing surface includes a flexible material;

wherein the top, bottom, side, and weighing surface are resistant to the passage of water;

wherein the array of force sensing resistors is positioned between the weighing surface and the at least one radio field antenna; and wherein the array of force sensing resistors and the at least one radio field antenna are configured to weigh and identify the tagged inventory item through the weighing surface.

2. The system of claim 1, wherein the radio field tag includes an item adhesive layer, a concentrating layer, and an integrated circuit layer, and wherein the concentrating layer is in contact with and located between the item adhesive layer and the integrated circuit layer.

3. The system of claim 1, wherein the radio field tag is a passive radio frequency identification tag, a battery assisted radio frequency identification tag, an active radio frequency identification tag, or a passive nearfield tag; and wherein the at least one radio field antenna includes an active radio field antenna or a passive radio field antenna.

4. The system of claim 2, wherein the concentrating layer includes a radio signal enhancing material.

5. The system of claim 1, wherein the array of force sensing resistors and the at least one radio field antenna are located between the top and the bottom of the inventory device.

6. The system of claim 5, wherein the array of force sensing resistors is closer to the top of the inventory device than the at least one radio field antenna, and optionally, the array of force sensing resistors is in contact with the top of the inventory device.

7. The system of claim 1, wherein the array of force sensing resistors and the at least one radio field antenna are configured to communicate with a system processor, and wherein the system processor is configured to communicate with at least one of a database, a display, and a network.

8. The system of claim 1, wherein the inventory item includes a vessel containing an amount of content, and wherein the content includes a solid, a liquid, a slurry, a particulate, or a combination thereof.

9. The system of claim 2, wherein the inventory item includes a vessel containing an amount of content, wherein the content includes a solid, a liquid, a slurry, a particulate, or a combination thereof; and wherein the concentrating layer enhances an amount of radio signal from the radio field tag to the at least one radio field antenna.

10. A method comprising:

providing a system that includes;

a tagged inventory item, wherein the tagged inventory item includes a radio field tag attached to an inventory item; and an inventory device, wherein the inventory device includes a weighing surface, an array of force sensing resistors, and at least one radio field antenna, wherein the inventory device includes a top, a bottom, and a side, wherein the top of the inventory device includes the weighing surface;

wherein the array of force sensing resistors and the at least one radio field antenna are configured to weigh and identify the tagged inventory item through the weighing surface;

wherein the weighing surface includes a flexible material, wherein the top, the bottom, the side, and the weighing surface of the inventory device are resistant to the passage of water;

detecting a weight change of from about 25.0 g to about 45.0 kg when the tagged inventory item is placed into contact with the weighing surface of the inventory device;

measuring a weight of the tagged inventory item; and identifying the tagged inventory item by turning on the at least one radio field antenna.

11. The method of claim 10, wherein the array of force sensing resistors and the at least one radio field antenna are configured to communicate with a system processor, wherein the system processor is configured to communicate with at least one of a database, a network, and a display.

12. The method of claim 11, the method further comprising:

transmitting at least one of a measurement time, a measurement date, a radio field tag code, a tagged inventory item identity, a temperature, a weight, and an inventory device code from the system processor to at least one of the database, the network, and the display.

13. The method of claim 10, wherein the at least one radio field antenna is turned on in response to the array of force sensing resistors detecting the weight change of from about 25.0 g to about 45.0 kg.

14. The method of claim 10, further comprising:

turning off the at least one radio field antenna after communicating a radio field tag code to a system processor.

15. The method of claim 10, wherein the inventory item includes a vessel containing an amount of content, wherein the content includes a solid, a liquid, a slurry, a particulate, or a combination thereof.

16. A system comprising:

a tagged inventory item, wherein the tagged inventory item includes a radio field tag attached to an inventory item, wherein the radio field tag includes an item adhesive layer, a concentrating layer, and an integrated circuit layer;

wherein the concentrating layer is in contact with and located between the item adhesive layer and the integrated circuit layer; and wherein the concentrating layer includes a radio enhancing material, wherein the radio enhancing material includes a solid foam, a polystyrene foam, a foam rubber, a silicone foam, a polyurethane foam, or combinations thereof; and an inventory device, wherein the inventory device includes a weighing surface, an array of force sensing resistors, and at least one radio field antenna, wherein the inventory device includes a top and a bottom, wherein the top of the inventory device includes the weighing surface, wherein the weighing surface includes a flexible material;

wherein the array of force sensing resistors is positioned between the weighing surface and the at least one radio field antenna; and wherein the array of force sensing resistors and the at least one radio field antenna are configured to weigh and identify the tagged inventory item through the weighing surface.

* * * * *